United States Patent [19]

Perin

[11] 4,176,727

[45] Dec. 4, 1979

[54] DEVICES FOR AUTOMATICALLY COUPLING IMPLEMENTS TO SELF-PROPELLED ARTICLES

[75] Inventor: Philippe Perin, Meudon, France

[73] Assignee: Societe Fiat France, S.A., Paris, France

[21] Appl. No.: 863,630

[22] Filed: Dec. 23, 1977

Related U.S. Application Data

[62] Division of Ser. No. 666,011, Mar. 11, 1976, Pat. No. 4,090,725.

[30] Foreign Application Priority Data

Mar. 19, 1975 [FR] France .............................. 75 08579

[51] Int. Cl.² .................... B60D 1/04; B60K 17/28; B60K 25/06
[52] U.S. Cl. .......................... 180/53 R; 280/479 A; 172/125
[58] Field of Search .................... 180/53 R, 53 D; 280/479 A; 189/36; 296/35.1; 287/53; 64/23; 172/47, 125, 272

[56] References Cited

U.S. PATENT DOCUMENTS

| 3,007,535 | 11/1961 | Lippke | 180/53 D |
| 3,283,840 | 11/1966 | Lane | 180/53 D X |
| 3,561,789 | 2/1971 | Strikeleather | 280/479 A |
| 3,961,677 | 6/1976 | Geisthoff | 180/53 D X |

Primary Examiner—Francis S. Husar
Assistant Examiner—Terrance L. Siemens

[57] ABSTRACT

A device for automatically coupling an implement to a vehicle comprises a rigid frame pivotally mounted on the chassis of the vehicle and extending generally horizontally therefrom. A hitching frame is pivotally mounted on the horizontal frame and carries upper and lower pairs of hitching jaws engageable with horizontal support bars of the implement. A double-acting ram is operatively connected to the hitching frame to pivot the hitching frame relative to the rigid frame during coupling and uncoupling operations.

3 Claims, 13 Drawing Figures

DEVICES FOR AUTOMATICALLY COUPLING IMPLEMENTS TO SELF-PROPELLED ARTICLES

This is a division of application Ser. No. 666,011, filed Mar. 11, 1976, now U.S. Pat. No. 4,090,725.

BACKGROUND OF THE INVENTION (1) Field of the Invention

The present invention relates to a device for automatically coupling an implement to the front or rear of a self-propelled vehicle.

(2) Description of the Prior Art

Hitching devices for coupling implements to a tractor or other vehicle have been proposed in which the coupling operation is performed in two stages. In the first stage a bottom supporting bar of the implement is secured to the tractor, and in the second stage an upper supporting bar of the implement is secured to the tractor. The powertake-off of the tractor is then coupled to the implement by hand.

An object of the invention is to provide a device in which manual intervention is avoided during the coupling and uncoupling operations.

SUMMARY OF THE INVENTION

According to the invention, there is provided in a self-propelled vehicle, a chassis, and a device mounted on the chassis for automatically coupling an implement to the vehicle, said device comprising a rigid member having opposed end portions, said member being pivotally connected at one end portion to the chassis and extending generally horizontally, lifting means, suspension means connecting said rigid member to the lifting means, a hitching frame pivotally mounted at the other end portion of the rigid member, said hitching frame having means for engaging the implement, and a double-acting ram operative to pivot the hitching frame.

BRIEF DESCRIPTION OF THE DRAWINGS

Embodiments of the invention will now be described by way of example only, with reference to the accompanying diagrammatic drawings, in which:

FIG. 6a is a cross section of the clutch teeth as seen along line VIa—VIa of FIG. 6.

DESCRIPTION OF THE PREFERRED EMBODIMENTS

Figure 1:
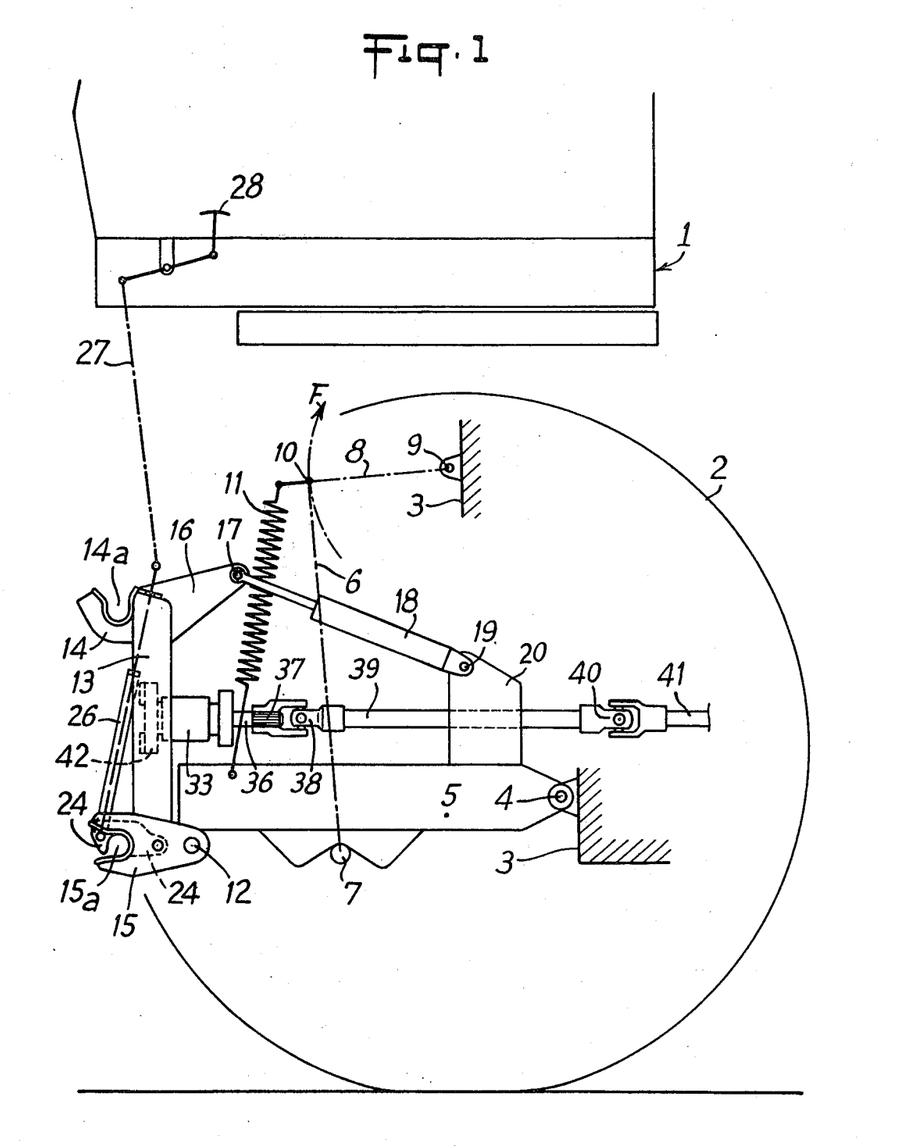
FIG. 1 is a schematic side elevation of the front part of a self-propelled vehicle incorporating a coupling device in accordance with the invention.
Figure 2:
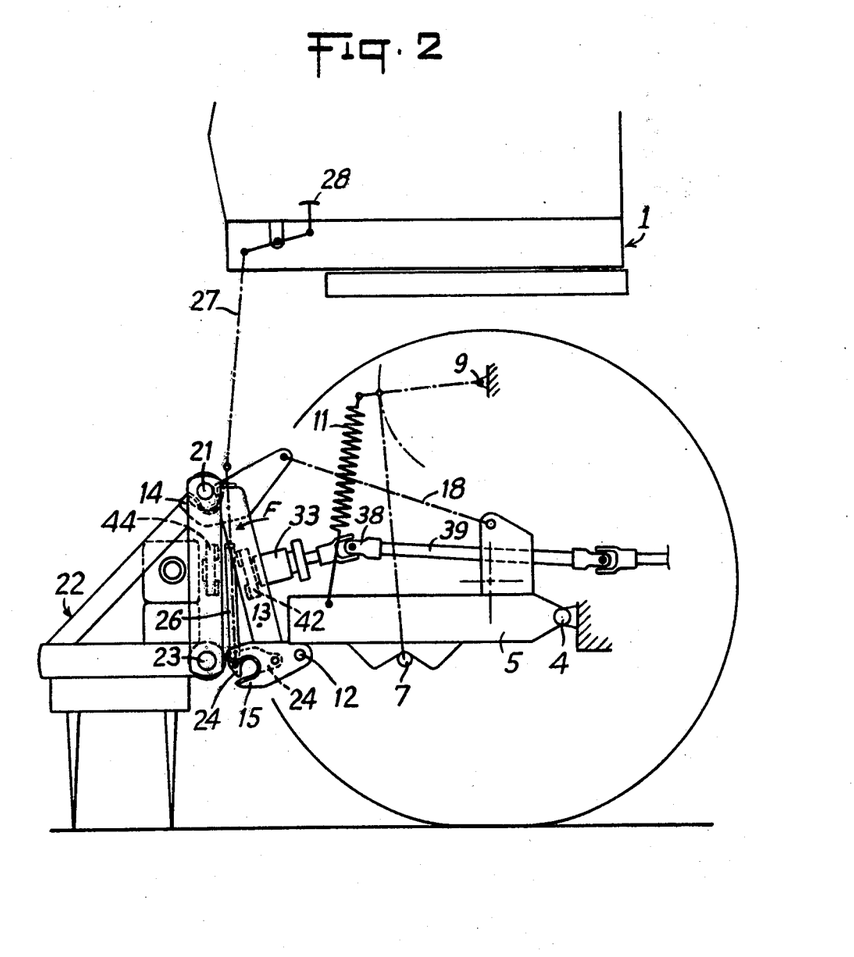
FIG. 2 is an elevation similar to FIG. 1 but showing the device during the coupling of an implement to the vehicle.
Figure 3:
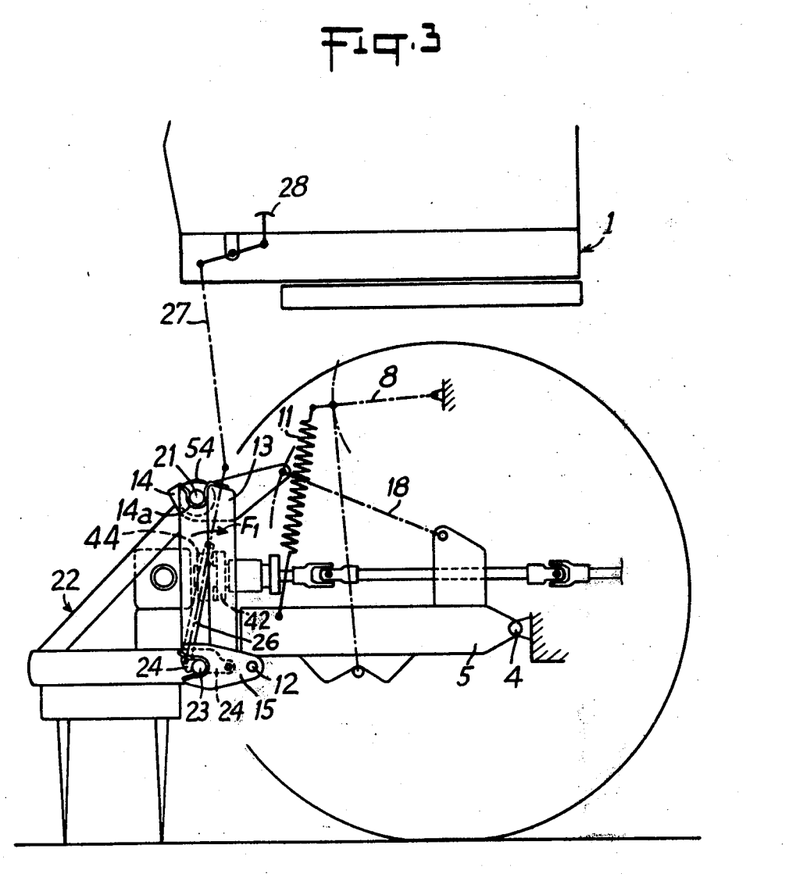
FIG. 3 is an elevation similar to FIG. 1 but showing the implement when coupled to the vehicle in its operating position.

There is shown schematically in FIGS. 1 to 3, the front portion of a self-propelled vehicle, having a drivers cab 1, wheels 2 and a chassis 3.

One end portion of a rigid horizontal frame 5 is journalled about a spindle 4 mounted on the chassis 3. The frame 5 is connected at 7 to suspension links 6, which are themselves journalled at 10 on levers or beams 8. The levers 8 are pivotably movable, in a direction indicated by the arrow F, about a spindle 9 mounted on the chassis 3, the levers 8 being connected to a hydraulic hoisting system of a type which is known per se and is not illustrated in the drawings.

The outer end portion of the lever 8 is linked to the upper end of a spring 11, the lower end of which is secured to the horizontal frame 5 to balance the implements carried thereby. This spring 11 may be replaced by a hydraulic load transfer device.

The end portion of the frame 5 remote from the spindle 4 carries a spindle 12 which pivotally supports a hitching frame 13 comprising four hitching points, of which only two are illustrated in FIGS. 1, 2 and 3 and which comprises a pair of top jaws 14 and a pair of bottom jaws 15. On its upper part, the frame 13 has an arm 16 to which is pivotably coupled at 17 one operative end portion of a double-acting ram 18, the other operative end portion of which is pivotably mounted at 19 on an arm 20 rigid with the frame 5 adjacent to the spindle 4.

The top jaws 14 have a seat 14a which receive a top supporting bar 21 of an implement 22 (FIG. 2) and the bottom jaws 15 have a seat 15a which receives a bottom supporting bar 23 of the implement.

The bottom jaws 15 are each equipped with a locking member 24 pivotal about a spindle 25 and connected via a yoke 26 and a cable 27 to a control pedal 28 situated in the cab 1. The end of the yoke 26 has a slot 29 in which is engaged a stud 30 rigid with the locking member 24.

Figure 4:
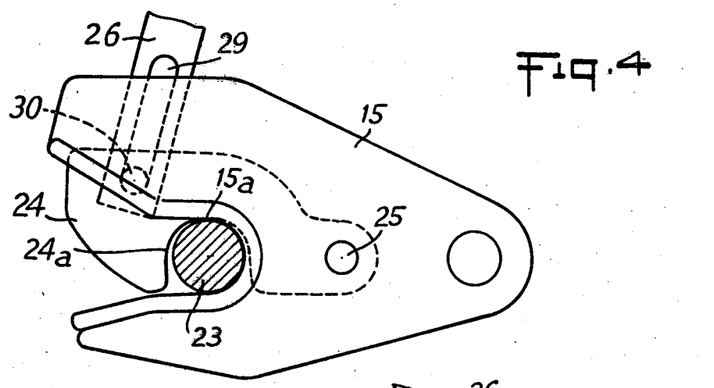
FIG. 4 is an elevation, to an enlarged scale, showing a jaw of the coupling device, and an associated locking member.

As shown in greater detail in FIG. 4, the locking member 24 has a semi-circular seat 24a in which the bar 23 is held fast.

Figure 5:
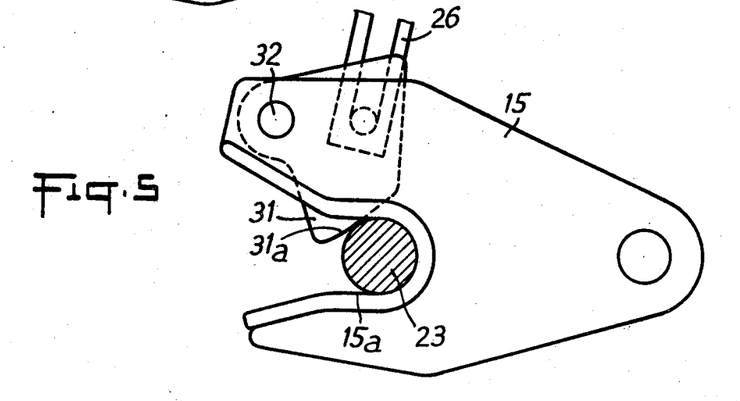
FIG. 5 is an elevation, similar to FIG. 4 and showing a modified form of locking member.

In a modified arrangement shown in FIG. 5, the locking member (designated 31) is pivoted about a spindle 32 and has a surface 31a which bears against the bar 23.

Figure 6:
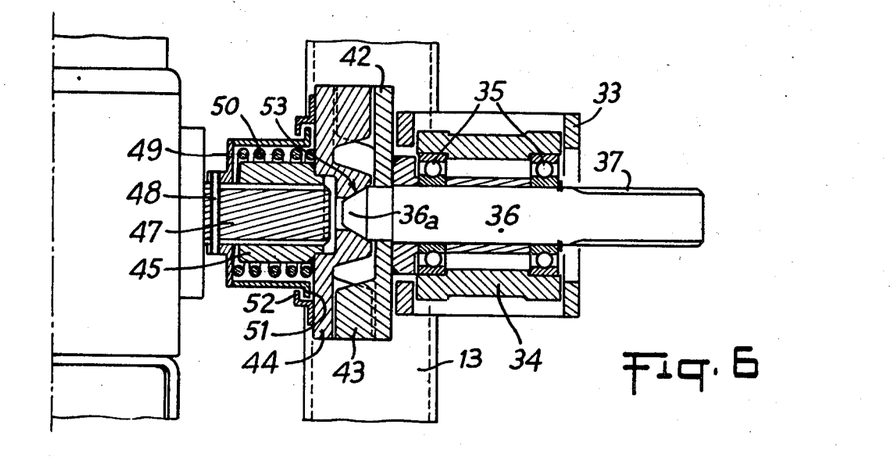
FIG. 6 is a longitudinal section showing means for coupling a power-take-off shaft of the vehicle to the implement.

The hitching frame 13 carries a housing 33 which is shown in greater detail in FIG. 6. In the housing 33 there is mounted a bearing 34 equipped with ball bearings 35 which journal a rotatable shaft 36 having a splined end portion 37. The end portion 37 is slidingly engaged in a sleeve-like element of a universal joint 38 connected via a shaft 39 and a second universal joint 40 to a power-take-off shaft 41, known as a PTO.

On the shaft 36 is secured a plate 42 having teeth 43 which co-operate with corresponding teeth of a plate 44 rigid with a sleeve 45 slidable on a splined shaft 47 for driving certain components of the implement 22. The plates 42 and 44 and their teeth, constitute driving and driven parts of a dog clutch. On the shaft 47 there is secured, by means of a pin 48, a casing 49 which houses a spring 50 bearing at one end against the base of the casing 49 and at the other end against the plate 44. The casing 49 has a shoulder 51 which is engageable by a shoulder 52 of the plate 44 under the action of the spring 50.

The shaft 36 has a conical end portion 36a which forms a centering spigot engageable in a corresponding conical socket 53 formed in the plate 44 and which is biased into contact with the shaft end portion 36a under the action of the spring 50.

The bearing 34 which supports the shaft 36 and the plate 42 can be displaced vertically and laterally through a short distance to permit exact centering of the plates 42 and 44.

To prevent fouling between the two plates 42 and 44 upon engagement of the teeth, the teeth 43 have a frustoconical entry, the entraining surfaces of the teeth being at right angles to the surfaces of the plates.

The device operates in the following manner:

With the hitching frame 13 located in the position illustrated in FIG. 1, the ram 18 is actuated so that the same assumes an extended position in which it is held by means of a locking valve incorporated in it (FIG. 2). This results in a forward pivoting displacement of the frame 13 according to the arrow F of FIG. 2 around the spindle 12, the frame 13 being inclined in an appropriate manner to enable the seats 14a of the jaws 14 to be positioned below the top bar 21 of the implement. In this position, the plate 42 is also inclined in view of the fact that it is rigid with the frame 13.

The ram 18 is then actuated to cause the frame 13 to pivot about the spindle 12 according to the arrow $F_1$ in FIG. 3 so that the top bar 21 of the implement 22 is engaged in the seats 14a of the jaws 14, dished washers 54 being incorporated to ensure easier positioning. While continuing its upward displacement, the frame 13 lifts the implement 22 which pivots around the top bar 21 engaged in the jaws 14 whereby the bottom bar 23 is engaged in the seats 15a of the bottom jaws 15. The locking members 24 are lifted by the bottom bar 23 during its movement into the seats 15a, the locking members 24 thereafter dropping to ensure a positive connection of the implement to the vehicle as illustrated in FIG. 3. During this time, the plate 42 accompanies the displacement of the frame 13 and the teeth 43 come into engagement with the corresponding teeth of the plate 44 carried by the implement 22.

Thus a connection is also established between the implement and the PTO of the vehicle.

In order to uncouple the implement 22, the locking members 24 are lifted by remote control by the operator who depresses the pedal 28 situated in the cab 1, and the frame 13 is pivoted in forward direction according to the arrow F in FIG. 2 to release the bars 21 and 23 from the jaws 14 and 15.

Figure 7:
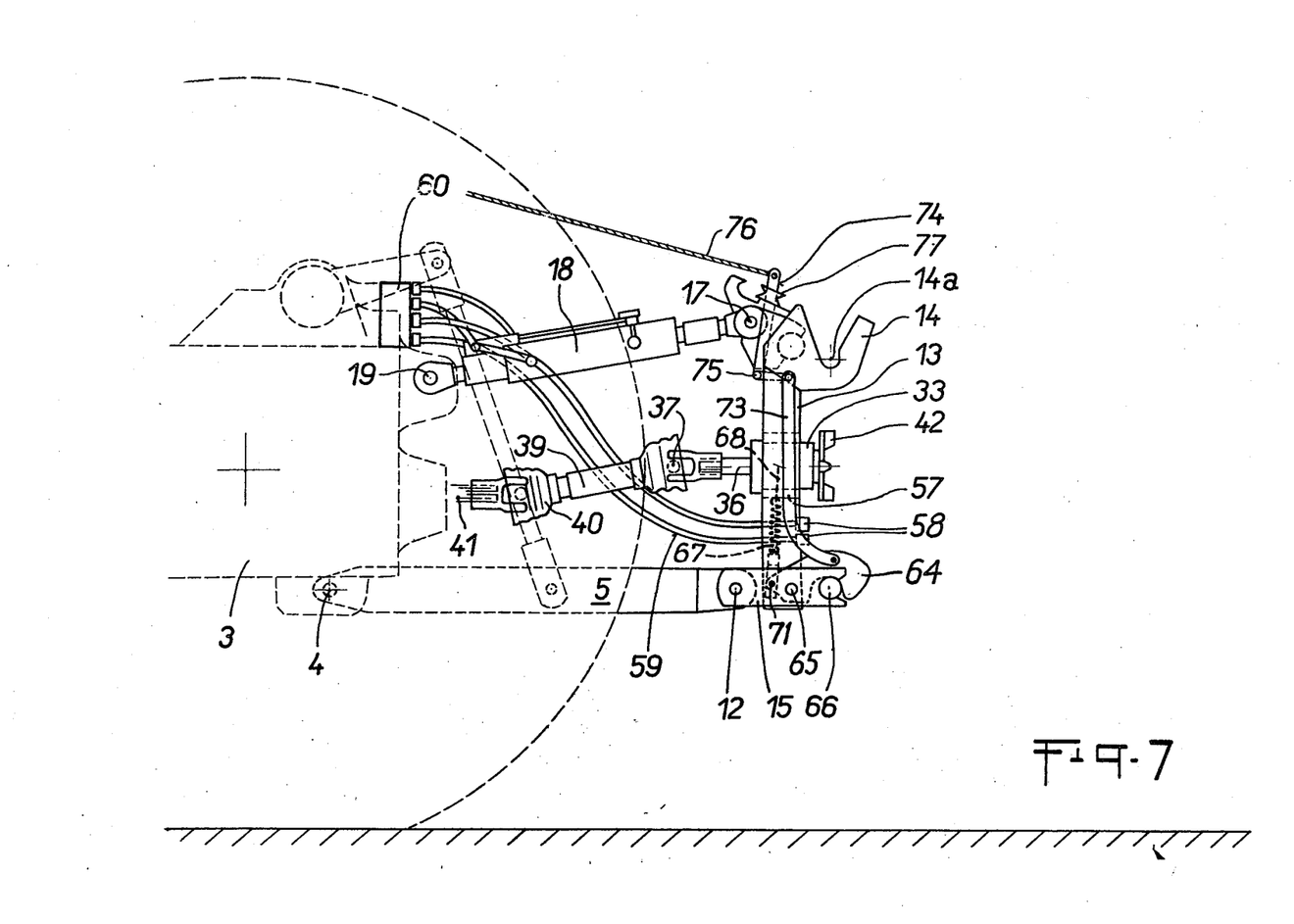
FIG. 7 is a schematic side elevation of the rear part of a self-propelled vehicle incorporating another form of coupling device in accordance with the invention.
Figure 8:
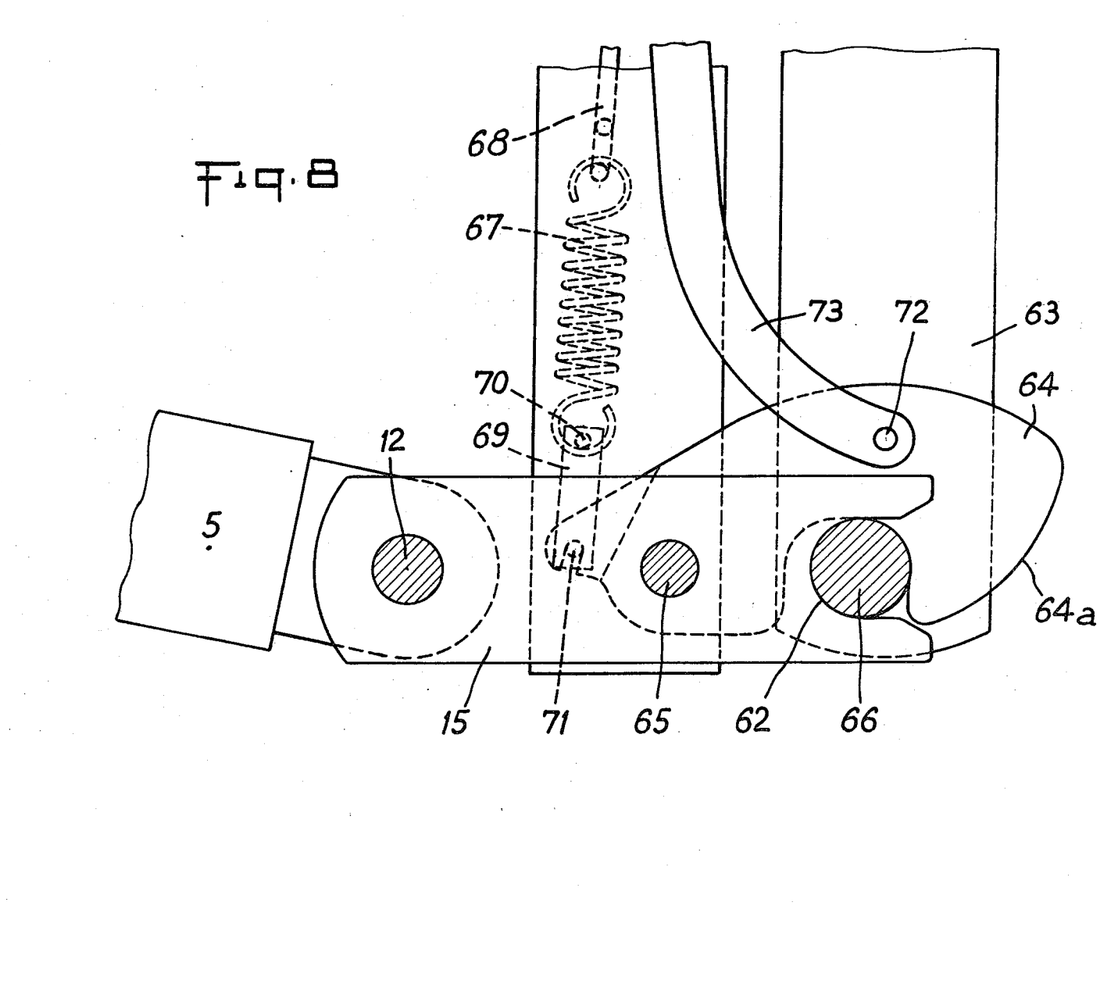
FIG. 8 is a side elevation, to an enlarged scale, showing a bottom jaw of the coupling device of FIG. 7.
Figure 9:
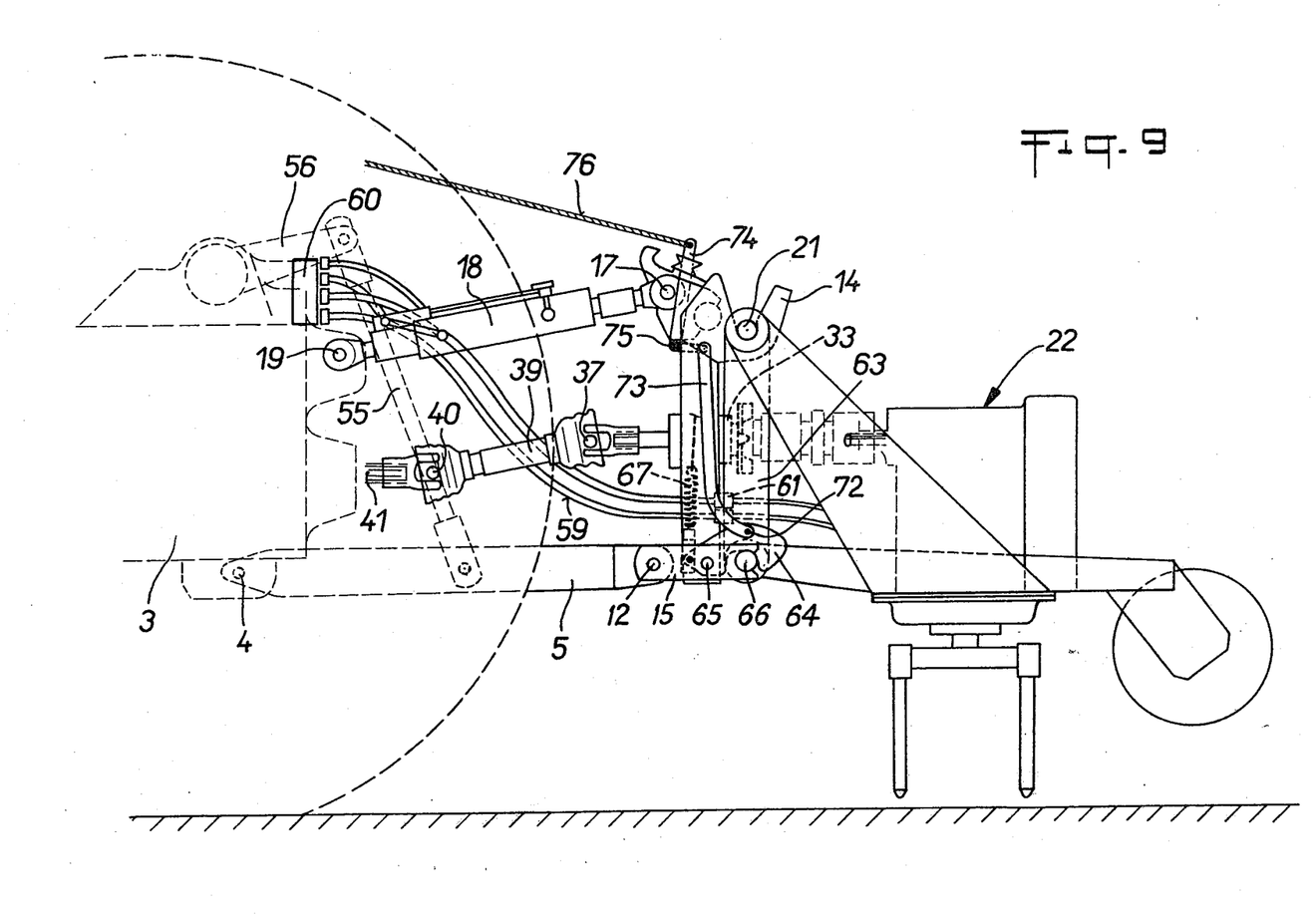
FIG. 9 is an elevation, similar to FIG. 7 but showing the implement coupled to the vehicle.

In a modified form of the device shown in FIGS. 7 to 9, the hitching frame 13 is coupled to components 5, 55, 56 of the hydraulic lifting system of a tractor by means of spindles 12 at the lower part of the frame 13 and to the ram 18 pivoted at 17 to the upper part of the frame 13.

The universal joint transmission system 37, 39, 40 connects the PTO shaft 41 of the tractor to the plate 42, the shaft 36 being journalled by the bearing 34, the housing 33 of which is secured to the frame 13 by means of elastic securing or mounting devices 57, such as rubber elements which facilitate centering of the co-operating parts and absorb the vibrations of the mechanism.

On the hitching frame 13 are secured hydraulic union socket valves 58 which are connected to an auxiliary hydraulic distributor 60 of the tractor via flexible pipes 59, the socket valves 58 being connected to plug-in valves 61 which supply the hydraulically-driven elements of the implement.

The jaws 15 illustrated in FIG. 8 and situated at the lower part of the frame 13, each have a seat 62 which receive a bar 66 secured to a fixed frame 63 of the implement 22.

The body of each jaw 15 carries a spindle 65 which pivotally supports a locking hook 64 arranged to clamp the bar 66 in the seats 62 of the jaws 15 under the action of a coil spring 67 which is secured at one end to a rod 68 rigid with the frame 13 and at the other end of a spindle 70 rigid with a small bar 69 journalled around a pin 71 carried by an extension of the hook 64. A rod 73 connected to a lever 74 pivotal on the frame about a pin 75, is pivotal about a pin 72 on the hook 64.

The lever 74 is controlled either by means of a cable or other flexible element 76, or by a suitable hydraulic, pneumatic or electrical control system. A catch 77 of "diabolo" shape holds the hooks 64 in a raised position.

In operation of the device shown in FIGS. 7 to 9, the ram 18 is extended to engage the bar 21 of the implement in the seats 14a of the top jaws 14.

When the hydraulic lifting system 5, 55, 56 of the tractor is actuated, to raise the frame 13, the bar 66 of the implement lifts the bottom hooks 64 by acting on a sloping surface 64a of each hook 64 and abuts against the base of the seats 62 of the jaws 15. Under the action of the spring 67, each hook 64 is returned into the closed position, thus ensuring the locking of the bars 66 in the seats 62.

Simultaneously with the hitching of the implement 22, coupling of the PTO 41 to the implement is effected via the universal joint transmission system, and the valves 58, 61 of the hydraulic supply system are engaged.

To uncouple the implement, the operator raises the hooks 64 against the action of the springs 67, by means of the cable 76, the lever 74, and the rod 73. The catch 77 holds the hooks 64 in the raised position so that the operator has both hands free during the uncoupling operation. Another pull on the cable 76 frees the hooks 64 which return to their initial position and render the device ready for another coupling operation.

Figure 10:
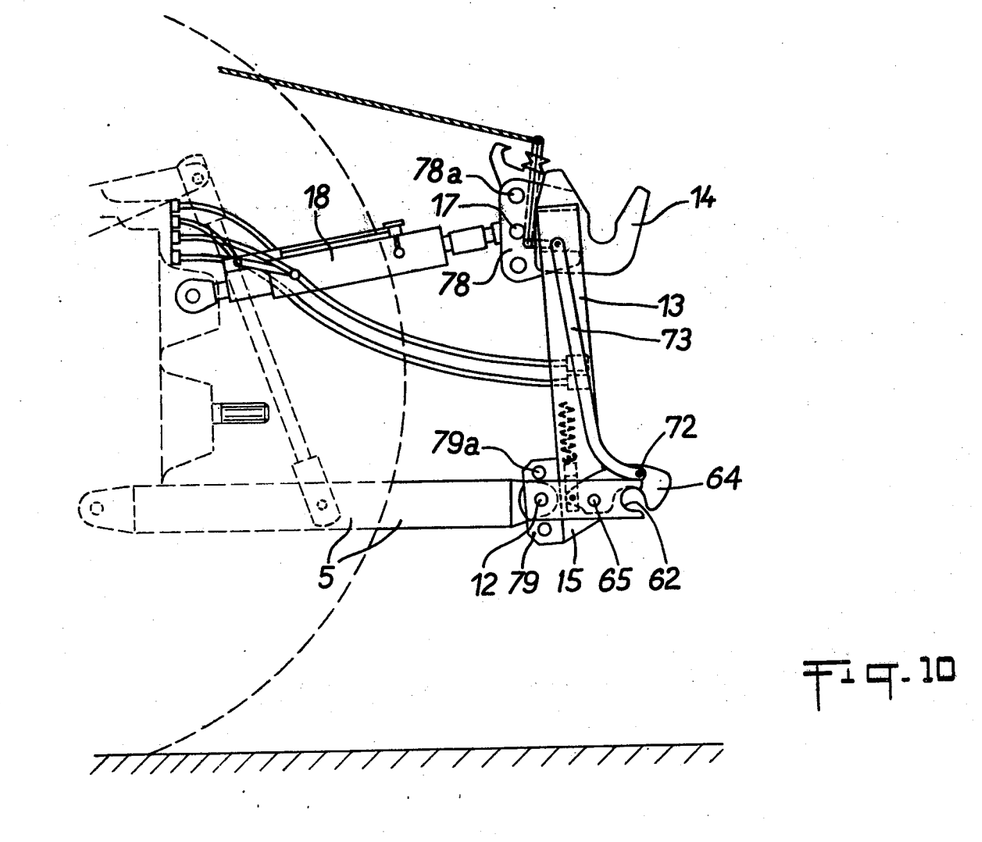
FIG. 10 is an elevation of yet another modified form of coupling device in accordance with the invention.

In the device shown in FIG. 10, the hitching frame 13 comprises at its top and bottom sections, plates 78, 79 each having a series of holes 78a, 79a, in which are selectively engaged pins 17 and 12 for securing the frame 13 to the double-acting ram 18 and the horizontal frame 5. These holes are so positioned that they permit hitching and adjusting of different types of hydraulic turnover reversible ploughs and other ploughs to obtain satisfactory working.

Figure 11:
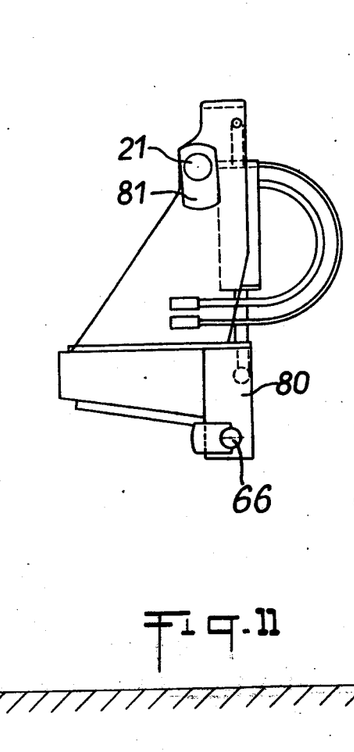
FIG. 11 is a side elevation of a plough coupling head.
Figure 12:
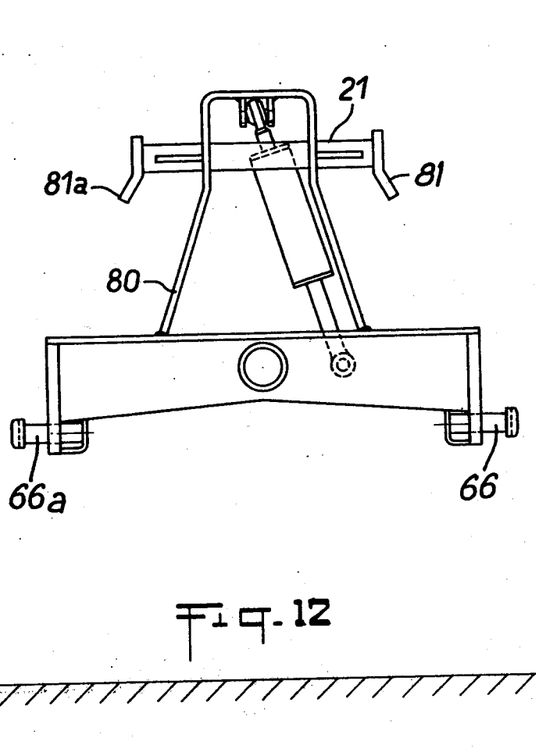
FIG. 12 is a front elevation of the plough coupling head.

In FIGS. 11 and 12 there is illustrated a hydraulic turnover plough coupling head 80, having a kinetic arrangement identical to that of conventional heads; however, the head illustrated has a rigid frame equipped at its upper part with a horizontal two-point hitching spindle 21, which is intended to be engaged on the top jaws 14 of the frame 13 of the coupling device described earlier. To ease the engagement of the spindle 21, the latter is equipped with entry "deflector" elements 81, 81a at its two extremities. At its lower part, the plough coupling head 80 is equipped, as has been described in the foregoing, with bars 66, 66a intended to be engaged in the seats 62 of the jaws 15 and to be held by the locking hooks 64.

In the devices described above, coupling and uncoupling of the implement is performed automatically without the need for direct manual intervention, and under the control of only one operator.

What is claimed is:

1. A self propelled vehicle including means for coupling an implement thereto comprising:
(a) a chassis:
(b) a device mounted on the chassis for automatically coupling an implement to said vehicle comprising:
   (1) a rigid member having opposed end portions, said member being pivotally connected at one end portion to the chassis and extending generally horizontally,
   (2) lifing means mounted on a hitching frame,
   (3) suspension means connecting said rigid member to said lifting means,
   (4) said hitching frame pivotally mounted at the other end portion of the rigid member, said hitching frame including jaw clamping means for releasably engaging said implement, and
   (5) a double-acting ram operative to pivot the hitching frame, said vehicle further comprising
(c) a driving member,
(d) a drive transmitting system connected to the driving member including:
   (1) a universal joint
   (2) a shaft
   (3) a housing mounted on said hitching frame, bearing means mounted in said housing rotatably supporting said shaft,
   (4) slide coupling means connecting the shaft to the drive-transmitting system,
   (5) driving clutch plate means rigid with the shaft, having teeth with a conical leading edge
(e) an implement having driven components and driven clutch plate means operatively connected to said driven components, said driven clutch plate means having teeth having conical leading edges designed to mate with said teeth of said driving clutch plate means and having entraining surfaces at right angles to the surface of said clutch plate means
(f) said implement further comprising a splined shaft, slideable sleeve means rotatable with said spline shaft, said sleeve means being rigid with the driven clutch plate means, housing means rigid with said spline shaft, said housing means including an abutment, and spring means interposed between the housing means and the driven clutch plate means to bias said driven clutch plate means axially of the splined shaft toward said driving clutch plate means, said abutment restricting axial movement of the driven clutch plate means under the bias of the spring means.

2. A combination according to claim 1, wherein one of said clutch plate means is rigid with a conical centering socket, and the other of said clutch plate means is rigid with a conical centering spigot, said spigot being engageable in the socket.

3. A vehicle according to claim 1, further comprising resilient mounting means mounting the housing on the hitching frame.

* * * * *